(12) United States Patent
Moorlag et al.

(10) Patent No.: US 8,692,011 B2
(45) Date of Patent: Apr. 8, 2014

(54) COATINGS FOR INK JET PRINT HEAD FACE

(75) Inventors: Carolyn Moorlag, Mississauga (CA); Yu Qi, Oakville (CA); Michelle N. Chretien, Mississauga (CA); Peter G. Odell, Mississauga (CA); Guiqin Song, Milton (CA); Qi Zhang, Mississauga (CA); Nan-Xing Hu, Oakville (CA)

(73) Assignee: Xerox Corporation, Norwalk, CT (US)

( * ) Notice: Subject to any disclaimer, the term of this patent is extended or adjusted under 35 U.S.C. 154(b) by 304 days.

(21) Appl. No.: 13/069,305

(22) Filed: Mar. 22, 2011

(65) Prior Publication Data

US 2012/0242749 A1  Sep. 27, 2012

(51) Int. Cl.
*C07F 7/04* (2006.01)
(52) U.S. Cl.
USPC .......................................... 556/435

(58) Field of Classification Search
USPC ............................................. 556/435; 528/36
See application file for complete search history.

(56) References Cited

U.S. PATENT DOCUMENTS

2005/0062801 A1 * 3/2005 Kato et al. ..................... 347/45

* cited by examiner

*Primary Examiner* — Wu-Cheng Winston Shen
*Assistant Examiner* — Kofi Adzamli
(74) *Attorney, Agent, or Firm* — Pillsbury Winthrop Shaw Pittman LLP (57) ABSTRACT

A novel composition for use as a print head face plate coating. In particular, the coating comprises siloxyfluorocarbon (SFC), which is composed of networked precursors containing reactive siloxane groups attached to fluorocarbon chains. The present SFC coatings can be used to produce a surface whereby solid ink and ultraviolet (UV) curable inks do not adhere when applied at elevated temperatures and over an extended period of time. The advantages of the present coating are fewer print head related defects, and longer front face life.

5 Claims, 4 Drawing Sheets

COATINGS FOR INK JET PRINT HEAD FACE

BACKGROUND

Ink-jet printing comprises ejecting ink droplets from orifices in a print head onto some type of receiving media to form a desired image. These printers generally use solid ink or phase change ink. Solid ink or phase change ink printers conventionally receive ink in a solid form, sometimes referred to as solid ink sticks. The solid ink sticks are typically inserted through an insertion opening of an ink loader for the printer, and are moved by a feed mechanism and/or gravity toward a heater plate. The heater plate melts the solid ink impinging on the plate into a liquid that is delivered to a printhead assembly for jetting onto a recording medium. The recording medium is typically paper or a liquid layer supported by an intermediate imaging member, such as a metal drum or belt.

A printhead assembly of a phase change ink printer typically includes one or more printheads each having a plurality of ink jets from which drops of melted solid ink are ejected towards the recording medium. The ink jets of a printhead receive the melted ink from an ink supply chamber, or manifold, in the printhead which, in turn, receives ink from a source, such as a melted ink reservoir or an ink cartridge. Each ink jet includes a channel having one end connected to the ink supply manifold. The other end of the ink channel has an orifice, or nozzle, for ejecting drops of ink. The nozzles of the ink jets may be formed in an aperture, or nozzle plate that has openings corresponding to the nozzles of the ink jets. During operation, drop ejecting signals activate actuators in the ink jets to expel drops of fluid from the ink jet nozzles onto the recording medium. By selectively activating the actuators of the ink jets to eject drops as the recording medium and/or printhead assembly are moved relative to each other, the deposited drops can be precisely patterned to form particular text and graphic images on the recording medium.

Proper operation of an inkjet requires the maintenance of a meniscus of ink at the jet orifice. As the ink cycles through a pulse sequence this meniscus may move slightly but a uniform response is required across all the jets to achieve reliable jetting and good directionality. The meniscus can be affected by nozzle contamination. Nozzle contamination may be caused by dust, paper fibers, ink, etc. that accumulates on the nozzle or face plate of a print head. Removing this contamination and air bubbles that may have entered the inkjet channels can be accomplished by purging ink usually by applying pressure to the ink such that it flows out of the orifice carrying the contaminant or air bubble. The ink may flow by gravity to the bottom of the face plate or be assisted by a wiping mechanism or vacuum. For successful printhead operation the face plate must able to shed the excess ink of purging or ink that otherwise accumulates around the jet aperture. Contamination around the jet aperture or deterioration of the surface quality near the jet aperture can lead to spontaneous loss of the ink meniscus often described as drooling.

Drooling, or the loss of the ink meniscus in the jet aperture, results in an unacceptable loss of print quality. Other than as described above, drooling may be caused by any combination of the inherent property of some ink formulation types, ink aging, sporadic contamination of ink, and/or mechanical degradation of the face plate coating. Both wear/damage ink adhesion or other issues lead to print head failure, and increases run costs.

As such, there is desired an alternative to the conventional print head face plate coatings that are used. In particular, a more robust coating is desired—one that is both resistant to surface damage and displays minimal surface wetting that leads to drooling or flooding of solid inks or ultraviolet (UV) curablecurable inks. Ideally, an ink jet front face coating should adhere well to the face plate surface, form a cohesive 1-5 micron coating across the surface, and display hydrophobic and/or oleophobic interactions when in contact with inks. The advantages of such a coating would be fewer print head related defects, and longer front face life.

SUMMARY

According to the embodiments illustrated herein, there is provided a novel composition for use in printhead assemblies.

In particular, the present embodiments provide a topcoat layer for ink jet printhead components comprised of a fully cross-linked material comprised of siloxyfluorocarbon.

In further embodiments, there is provided an ink jet print head face plate comprising a metal, ceramic, or polymer face plate; and a topcoat layer disposed on the face plate, wherein the topcoat layer comprises cross-linked material comprised of siloxyfluorocarbon.

In yet other embodiments, there is provided an ink jet print head face plate comprising: a metal, ceramic or polymer face plate; and a topcoat layer disposed on the face plate, wherein the topcoat layer comprising siloxyfluorocarbon is formed from a coating solution comprising fluorocarbon containing silicon alkoxide groups in one or more alcohol solvents.

BRIEF DESCRIPTION OF THE DRAWINGS

For a better understanding of the present embodiments, reference may be had to the accompanying figures.

DETAILED DESCRIPTION

In the following description, it is understood that other embodiments may be utilized and structural and operational changes may be made without departure from the scope of the present embodiments disclosed herein.

Figure 1:
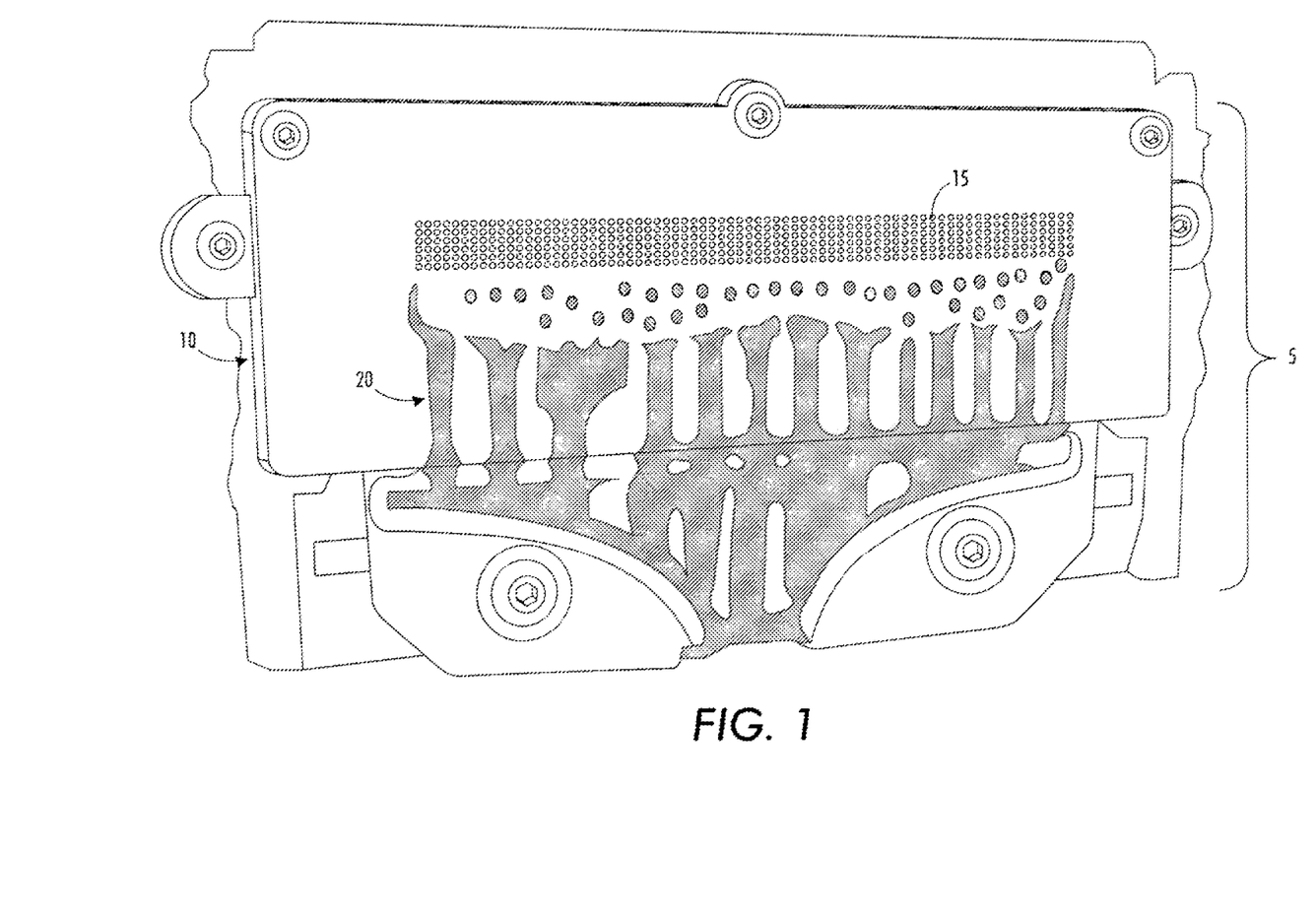
FIG. 1 is an illustration of an exemplary face plate exhibiting drooling.
Figure 2:
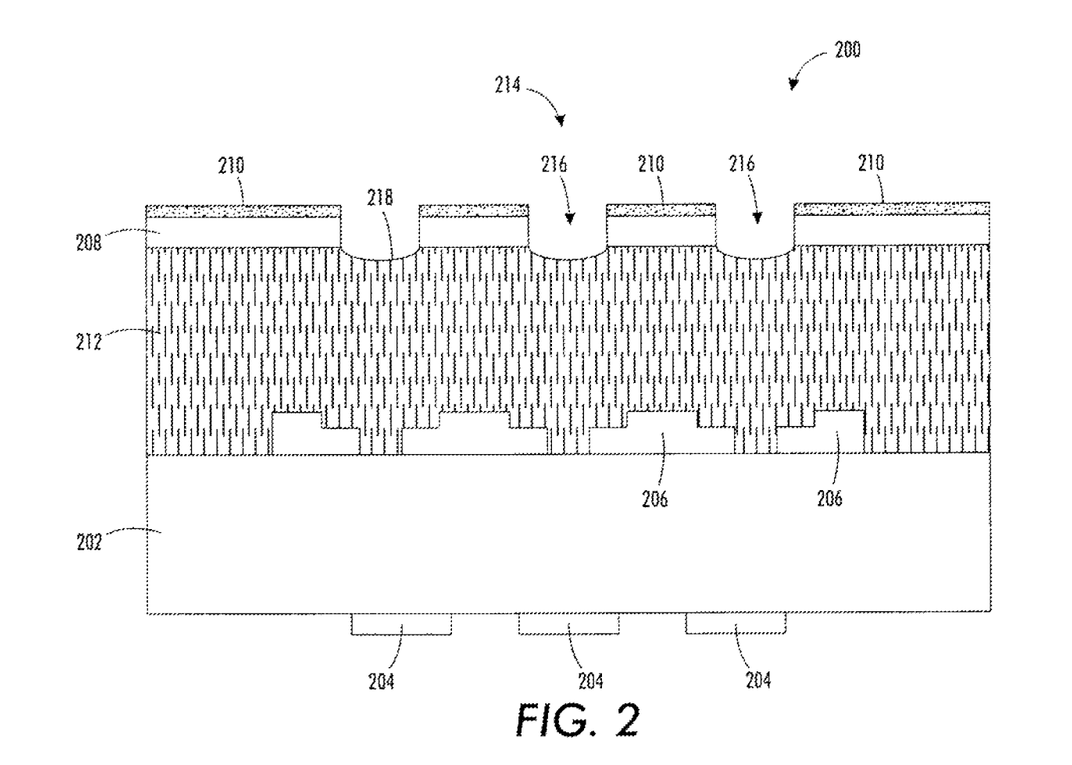
FIG. 2 is an illustration of a printhead having the coating according to the present embodiments.

The present embodiments provide a novel composition for use as a print head face plate coating to avoid many issues faced with conventional face plates, such as drooling or flooding. The novel composition can also be used in other inkjet printer components such as, for example, an image transfixing member. In particular, the coating comprises siloxyfluorocarbon (SFC). FIG. 1 illustrates an exemplary face plate 5. As shown, the front face 10 of the print head face plate 5 is displayed with the ink nozzles 15 located along the center strip of the front face 10. The image shown displays an example of flooding, where ink has drooled 20 out of the nozzles 15 to result in print head failure. The coatings of the present disclosure may be used with any type of print head. Referring to FIG. 2, a printhead 200 having the coating of the present disclosure, which comprises SFC, disposed thereon is illustrated. Printhead 200 includes a base substrate 202 with transducers 204 on one surface and acoustic lenses 206 on an opposite surface. Spaced from the base substrate 202 is a liquid level control plate 208. A coating 210 in accordance with the present disclosure is disposed along plate 208. In embodiments, the coating comprising SFC may have a thickness ranging from about 100 nm to about 20 μm, such as ranging from about 500 nm to about 10 μm, or ranging from about 1 μm to about 5 μm.

The base substrate 202 and the liquid level control plate 208 define a channel, which holds a flowing liquid 212. The liquid level control plate 208 contains an array 214 of apertures 216. The transducers 204, acoustic lenses 206, and apertures 216 are all axially aligned such that an acoustic wave produced by a single transducer 204 will be focused by its aligned acoustics 206 at approximately a free surface 218 of the liquid 212 in its aligned aperture 216. When sufficient power is obtained a droplet is emitted from surface 218.

The coating 210 in accordance with the present embodiments is disposed on the printhead front face along plate 208 and provides the printhead front face with sliding angle characteristics to prevent ink from accumulating near the nozzles and interfering with the jetting of the ink droplets. In specific embodiments, the coating 210 may provide the printhead front face with sliding angle characteristics such that satellite droplets of ink, such as UV curable ink and solid ink, landing on the nozzle plate exhibit a low sliding angle, wherein the low sliding angle is less than about 80 to less than about 30 with the printhead front face surface having the coating.

Figure 3:
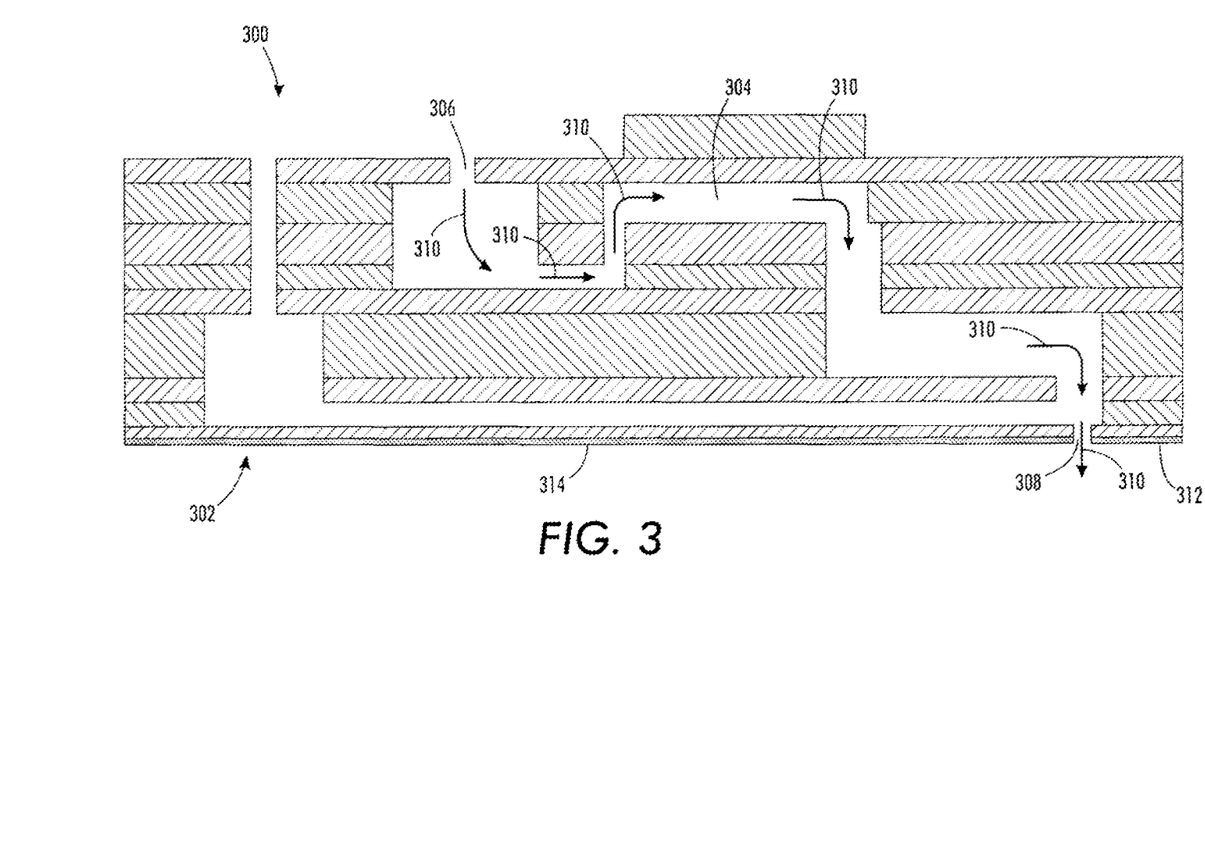
FIG. 3 is an alternative illustration of a printhead having the coating according to the present embodiments.

FIG. 3 illustrates another embodiment of a printhead 300 having a coating disposed thereon in accordance with the present embodiments. In FIG. 3, a drop on demand ink jet print head 300 has a body 302 that includes one or more ink pressures chambers 304 coupled to or in communication with one or more ink sources 306. Ink jet print head 300 has one or more ink ejection means such as orifices or nozzle/outlets 308. A typical ink jet printer includes a plurality of ink pressure chambers 304 with each pressure chamber 304 coupled to one or more nozzle/outlets 308. For simplification, a single outlet 308 is illustrated in FIG. 3. Each nozzle/outlet 308 is coupled to or in communication with an ink pressure chamber 304 by way of an ink passage indicated by arrows 310. Ink passes through nozzle/outlet 308 during ink drop formation. Ink drops travel in a direction along path 310 from nozzle outlets 308 toward a print medium (not shown) that is spaced from nozzle/outlets 308. Nozzle/outlets 308 can be formed in an orifice plate or print head front face plate 312 contained on body 302 on the outlet side of the ink jet print head 300. A coating 314 in accordance with the present disclosure is disposed along the orifice plate 312.

As stated above, the present embodiments provide a novel composition for use as a print head face plate coating, and in particular, the coating comprises SFC. SFC is composed of networked precursors containing reactive siloxane groups attached to fluorocarbon chains. Processing of SFC precursors by sol-gel synthesis initiates crosslinking to yield a highly chemically bound material system. In the SFC system, siloxane groups will bond efficiently to substrates such as steel and polyimide, while low surface energy fluorocarbon chains contribute to an anti-stick surface. The present SFC coatings can be used to produce a surface whereby solid ink and UV curable inks do not adhere when applied at elevated temperatures and over an extended period of time. For example, the SFC coatings exhibits little or no adherence to solid ink and UV curable inks at a temperature of from about 40 to about 180° C. Minimal interaction between the coated surface and inks is attributed to the low surface energy of the SFC coating material. The inherent strength of this ceramic/fluorocarbon hydrid and self-adhesion to surfaces (e.g., primer-free) improves upon the robustness of current print head face coating materials. The present embodiments thus decrease the occurrence of print defects due to drooling or flooding and will also provide fewer print head related defects and longer front face life. As such, the present embodiments provide a face plate that can be used with solid and UV inks without the problems faced with conventional face plates. In further embodiments, the composition may also include one or more fluoroplastic resins such as, for example, perfluoro alkoxyalkane (PFA). In such embodiments, the fluoroplastic resin may be present in the composition in an amount of from about 5 percent to about 95 percent by weight of the total weight of the composition.

Solid inks are those characterized by being solid at room temperature and molten at an elevated temperature at which the molten ink is applied to a substrate. Solid inks generally comprise an ink vehicle, one or more waxes, an optional colorant, and one or more optional additives such as viscosity modifiers, antioxidant, plasticizer, and the like. UV curable inks generally comprise a photoinitiator package, a curable carrier material, an optional colorant, and one or more optional additives such as viscosity modifiers, dispersant, synergist, and the like. UV curable phase change inks, a subset of UV curable inks, may also include a gellant and optionally a curable wax. The term "curable" refers, for example, to the component or combination being polymerizable, that is, a material that may be cured via polymerization, including, for example, free radical routes, and/or in which polymerization is photoinitiated though use of a radiation sensitive photoinitiator. For example, the curable carrier material may be one or more curable monomers or a curable wax.

Figure 4:
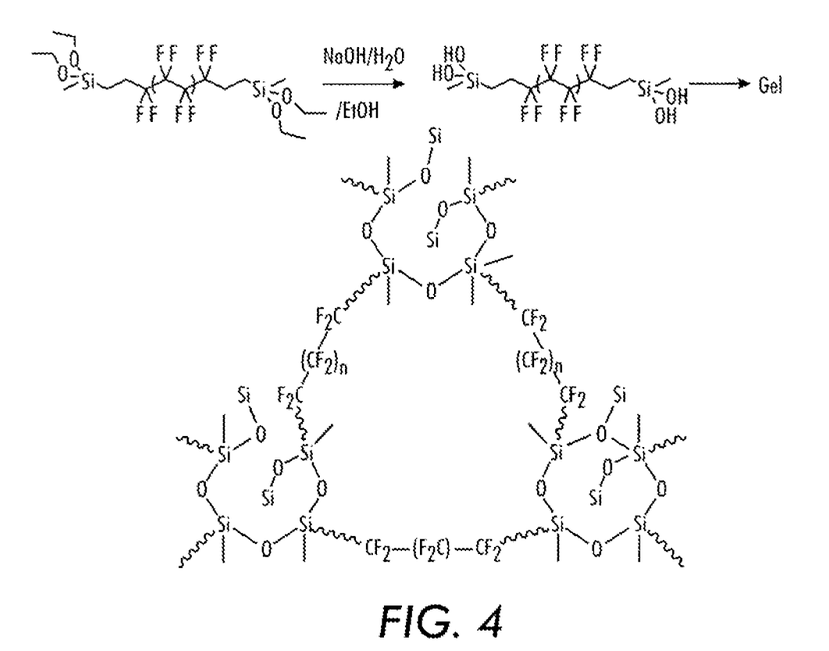
FIG. 4 is a reaction scheme illustrating the synthesis of the SFC network through a sol-curable process according to the present embodiments.

Disclosed herein is a face plate coating that includes a siloxyfluorocarbon networked polymer. SFC contains reactive siloxane functional groups and is networked by a sol-gel processing as is shown in FIG. 4. SFC precursors incorporate fluorinated chains to add flexibility and imparts low-surface energy to the resulting material. A variety of SFC precursors with varying siloxane and fluorocarbon components may be used to prepare coatings, including di- and tri-alkoxy silanes, linear and branched fluoroalkanes, fluoroarenes, and mixtures thereof.

Siloxyfluorocarbon monomers are crosslinked via sol-gel chemistry, where hydrolysis and condensation of alkoxide or hydroxide groups occurs and upon curing at elevated temperatures, produces a coating used on fusing surfaces. The siloxyfluorocarbon networked polymer can withstand high temperature conditions without melting or degradation, is mechanically robust under such conditions, and displays good release under such conditions.

Monofunctional, difunctional, or trifunctional silane end groups may be used to prepare a siloxyfluorocarbon networked polymer. Siloxyfluorocarbon monomers are represented by the structure:

wherein $C_1$ is an aliphatic or aromatic fluorocarbon chain; L is a $C_nH_{2n}$ linker group, where n is a number between 0 and about 10; and $X_1$, $X_2$, and $X_3$ are reactive hydroxide functionalities, reactive alkoxide functionalities, unreactive aliphatic functionalities of about 1 carbon atom to about 10 carbon atoms, unreactive aromatic functionalities of about 1 carbon atom to 10 carbon atoms.

In addition to the monomers listed above, the siloxyfluorocarbon networked polymer can be prepared using monomers having the following structure:

wherein $C_1$ represents a fluorocarbon chain, which may be aliphatic, aromatic, or contain mixtures of aliphatic or aromatic fluorocarbon chains; L is a $C_nH_{2n}$ linker group, where n is a number between 0 and about 10 (most likely 0 to 2); $X_1$, $X_2$, and $X_3$ may be reactive hydroxide or alkoxide functionalities, or unreactive functionalities (aliphatic or aromatic hydrocarbons).

In addition to the monomers listed above, the siloxyfluorocarbon networked polymer can be prepared using monomers that include non-fluorinated silane monomers selected from the group consisting of silicon tetraalkoxide and branched pentasilylchloride. The silicon tetraalkoxide and branched pentasilylchlorid are represented by the respective structures;

The siloxyfluorocarbon networked polymer comprises a fluorine content of between about 30 weight percent to about 70 weight percent or from about 40 weight percent to about 70 weight percent or from about 50 weight percent to about 70 weight percent. The silicon content, by weight, in the siloxyfluorocarbon networked polymer is from about 1 weight percent silicon to about 20 weight percent silicon, or from about 1.5 weight percent silicon to about 15 weight percent silicon or from about 2 weight percent silicon to about 10 weight percent silicon.

The monomers are networked together so that all monomers are molecularly bonded together in the cured coating via silicon oxide (Si—O—Si) linkages. Therefore, a molecular weight can not be given for the siloxyfluorocarbon networked polymer because the coating is crosslinked into one system.

In an embodiment, one can use metal alkoxide (M=Si, Al, Ti etc.) functionalities as cross-linking components between fluorocarbon chains. For cross-linking to occur efficiently throughout the composite, bifunctional fluorocarbon chains are used. Mono-functional fluorocarbon chains can also be added to enrich fluorination content. $CF_3$-terminated chains align at the fusing surface to reduce surface energy and improve release.

Examples of precursors that may be used to form a composite system include silicon tetraalkoxide and siloxane-terminated fluorocarbon chains and are shown below. Siloxane-based sol-gel precursors are commercially available. The addition of a silicon tetraalkoxide (such as a silicon tetraalkoxide, below) introduces extra cross-linking and robustness to the material, but is not necessary to form the sol-gel/fluorocarbon composite system.

Silicon Tetraalkoxide    Siloxane-terminated Fluorocarbon Chains

Fluorocarbon chains include readily available dialkene precursors which can then be converted to silanes via hydrosilation (Reaction 1). Monofunctional fluorinated siloxane chains are commercially available as methyl or ethyl siloxanes, or could be converted from chlorosilane or dialkene precursors.

Reaction 1: Preparation of fluorocarbon chain/silicon alkoxide precursors.

Shown below are some fluorinated and siloxane precursors that are commercially available. Fluorocarbon and siloxane materials are available from a variety of vendors including Gelest, Synquest, Apollo Scientific, Fluorochem, TCI America, Anachemica, Lancaster Synthesis Inc., and Polysciences Inc.

1,4-divinylperfluorobutane 1,6-divinylperfluorohexane 1,8-divinylperfluoroctane 1,4-divinyltetrafluorobenzene

4,4'-divinylperfluorodiphenyl n = 0, 3, 5, 7, 9; R = Cl, CH₃, CH₂CH₃
monofunctional silanes bifunctional silane tetrafuctional silane A representation of an example of a crosslinked composite system incorporating both monofunctional and difunctional fluorinated siloxane chains is shown in Structure 1. In this example, mechanical properties and fluorination content can be modified by adjustment of the ratio of mono- to difunctional precursors.

Structure 1: Representative of a sol-gel/fluorocarbon composite system.

Organic-inorganic hybrid materials have been prepared for flexible optical waveguide applications using a trifunctional siloxane group, and fluorinated bis-phenol-A, described in J. Mater. Chem. 2008, 18, 579-585. The resulting materials were reported to be hard, yet flexible, and crack-free. Hybrid materials of this type are often cited for optical waveguide applications due to desirable refractive index properties of fluorinated materials combined with the mechanical strength of ceramics. However, these materials are not suitable for print head face plate applications where surface robustness and low surface energy are required.

Solvents used for sol gel processing of siloxyfluorocarbon precursors and coating of layers include organic hydrocarbon solvents, and fluorinated solvents. Alcohols such as methanol, ethanol, and isopropanol are typically used to promote sol gel reactions in solution. Further examples of solvents include ketones such as methyl ethyl ketone, and methyl isobutyl ketone. Mixtures of solvents may be used. The solvent system included the addition of a small portion of water, such as from about 1 molar equivalent to 10 molar equivalents of water compared to siloxyfluorocarbon precursors or the siloxane terminated fluorocarbons, or from about 2 molar equivalents to about 4 molar equivalents of water.

Upon the addition of water to the solution of sol gel precursors, alkoxy groups react with water, and condense to form agglomerates that are partially networked, and are referred to as a sol. Upon coating of the partially networked sol onto a substrate, a gel is formed upon drying, and with subsequent heat treatment, the fully networked SFC coating (siloxyfluorocarbon networked polymer) is formed on the face plate.

A siloxyfluorocarbon networked polymer does not dissolve when exposed to solvents (such as ketones, chlorinated solvents, ethers etc.) and does not degrade at temperatures up to 350° C., and is stable at higher temperatures, depending on the system. The siloxyfluorocarbon networked polymer does not display ink wetting when the SFC coating is exposed to solid or UV ink or ink base, so that ink and other marking-related materials do not adhere to the face plate.

Application of a SFC layer may be carried out by spray-coating, flow-coating, or by other coating methods. One specific coating technique that may be used is meniscus coating of steel surfaced jetstacks while applying positive pressure to the apertures to prevent their occlusion during coating. When making polyimide aperture plates, the jet openings are formed by laser ablation after coating. The coating can include laser absorptive materials to aid the ablation process. Additionally this coating does not require an expensive fluorinated solvent. Typically, a solution of SFC material in ethanol or another alcohol, such as methanol or isopropanol, or mixture containing alcohol may be used as the coating solution, and is prepared with the addition of about 3-4 molar equivalents of water and a catalytic amount of acid or base to initiate networking, for example, from about 0.01 to about 0.1 molar equivalents of acid or base. In embodiments, the acid may be selected from the group consisting of hydrochloric acid, hydrobromic acid, perchloric acid, nitric acid, sulfuric acid, acetic acid, formic acid, and mixtures thereof. In embodiments, the base may be selected from the group consisting of sodium hydroxide, ammonium hydroxide, methylamine, and mixtures thereof. In embodiments, the fluorocarbon containing silicon alkoxide groups are present in an amount of from about 5 to about 50 percent by weight of the total weight of the coating solution, the alcohol solvent is present in an amount of from about 50 to about 95 percent by weight of the total weight of the coating solution, the water is present in an amount of from about 0.1 to about 0.5 percent by weight of the total weight of the coating solution, and the catalyst is present in an amount of from about 0.02 to about 1 percent by weight of the total weight of the coating solution. However, as discussed above, the solvent may also be one other than an alcohol.

After coating, the SFC layer is air-dried and heat-treated. Following air-drying and heat-treatment between 100° C. to 250° C. the SFC layer will network to yield a coating. The siloxane functionalities of SFC will self-bond to form the network, and also bond to a variety of substrates. Siloxy functionalities will bind to substrates of metals, ceramics, and polymers. Metal substrates may be selected from a group consisting of aluminum, steel, gold, silicon and mixtures thereof. Ceramic substrates may be selected from a group consisting of glass, quartz, metal oxides, and mixtures thereof. Polymer substrates may be selected from a group consisting of polyimide, polyimide, polycarbonate, polyester, polyethertherketone, polyetherimide, polyethersulfone, polysulfone, liquid crystal polymer, and mixtures thereof. SFC coatings display adhesion to the substrates previously mentioned, and cannot be removed by a significant amount of rubbing or scratching the surface.

The inherent strength of this ceramic/fluorocarbon hybrid and self-adhesion to surface makes SFC a good candidate for a primer-free topcoat. As shown in Table 1, SFC coatings on silicone substrates has been found to display surface energy values slightly higher than that of polyfluoro-alkoxy (PFA), and about the same magnitude as a fluoroelastomer available under the tradename VITON (available from E. I. du Pont de Nemours and Company (Wilmington, Del.)). It has been shown that surface energy is decreased significantly with extension of the fluorocarbon chain length of the precursor and corresponding increase in fluorine content. The surface energy can be modified by the choice of precursor.

TABLE 1

| Networked Material | Structure | Fluorine Content (%) | Surface Free Energy* (mN/m$^2$) |
|---|---|---|---|
| DSFB (disiloxy-fluorobutane) |  | 40 | 29.34 |

TABLE 1-continued

| Networked Material | Structure | Fluorine Content (%) | Surface Free Energy* (mN/m$^2$) |
|---|---|---|---|
| DSFH (disiloxy-fluorohexane) | [structure] | 48 | 23.46 |
| DSFO (disiloxy-fluorooctane) | [structure] | 53 | 21.29 |
| Viton-GF | [structure] wherein n = 20-70% wt, m = 20-60% wt, and o = 0-40% wt. | 71 | 22.93 |
| PFA | [structure] wherein n = 1-5% wt, and m = 95-99% wt. | 75 | 19.75 |

*SFE calculated from water, formamide, and diiodomethane contact angles

The present embodiments provide a topcoat layer for ink jet printer components comprising a cross-linked material comprised of siloxyfluorocarbon. No other materials are required in the face plate coating. Rather, the present embodiments provide a fully networked, coating comprised of sol-gel precursors. The siloxyfluorocarbon comprises the condensates of a fluorocarbon containing silicon alkoxide groups. The alkoxide groups may be monofunctional, bifunctional or of a higher degree of functionality. In particular, the siloxyfluorocarbon is a product of a sol-gel process facilitated through hydrolysis and condensation of silicon alkoxide groups. In particular embodiments, the fluorocarbon containing silicon alkoxide group is selected from the group consisting of 1. and mixtures thereof, where R is a hydrogen, methyl, ethyl, propyl, isobutyl, other hydrocarbon group, or mixtures thereof.

In specific embodiments, the ink jet printer component having the topcoat layer is a print head face plate. In such embodiments, the topcoat layer has an increased adherence to the metal or polymer face plate and increased wear resistance as compared to a topcoat layer without the siloxyfluorocarbon. In such embodiments, the topcoat layer also exhibits little or no adhesion with solid or ultraviolet curable inks at a temperature of from about 40 to about 180° C. as compared to a topcoat layer without the siloxyfluorocarbon.

The coating of the present disclosure is suitable for use with solid inks that are characterized by being solid at room temperature and molten at an elevated temperature. The magenta inks of the example are polyethylene wax based and containing amides. Also present are pigments, dispersants, synergists, and other additives, although this coating is also applicable for use with unpigmented systems.

The coating of the present disclosure is suitable for use with UV curable inks including phase-change UV curable inks. The cyan ink of the example is acrylate-based containing both difunctional and multifulctional acrylates. The ink also optionally contains a curable wax, that could alternatively be polyester or other waxy chains, and an organic gellator. UV inks also contain photoinitiators such as phosphine oxides, alpha-hydroxyketones, alpha-aminoketones and the like and a radical stabilizer such as nitroxide radical stabilizer. Also present are pigments and dispersants that could contain a block copolymer, although this coating is also applicable for use with unpigmented systems.

The inks described herein are further illustrated in the following examples. All parts and percentages are by weight unless otherwise indicated.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

Example 1

Coating

For the evaluation of siloxyfluorocarbon (SFC) coatings on potential ink jet face coating substrates, disiloxyfluorohexane, DSFH coatings were prepared on stainless steel and polyimide substrates. DSFH (0.25 g) was dissolved in ethanol (2 mL) to give a solution concentration of 0.4 M. The solution was spray-coated onto 15 cm×8 cm squares of stainless steel and polyimide thin sheets using a Paashe spray gun with a fine nozzle. The coatings were dried, and heat treated in an oven to a temperature of 218° C. A thin, glossy, transparent coating of about 2-5 microns was formed on surface that was firm yet moderately flexible. The coatings adhered well to both substrates, and could not be removed by rubbing or scratching the surface.

Surface Energy

The surface free energy of stainless steel and polyimide samples coated with DSFH were evaluated by measuring contact angle of water, formamide, and diiodomethane. Surface energies are similar to that observed on silicone substrate (as shown in Table 2: calculated surface energy of DSFH SFC coatings on stainless steel and polyimide substrates), and differences are attributed to substrate surface energy contributions that can occur for thin coatings of SFC layers. Processing optimization ensuring cohesive coverage of substrates by the SFC layer will modify the surface energy further. In Table 2, Coating 1 is SFC (0.1 g) coated onto a 8 cm by 15 cm stainless steel substrate, and Coating 2 is SFC (0.1 g) coated onto a 8 cm by 15 cm polyimide substrate.

TABLE 2

| Sample ID | LW | − | + | Surface Free Energy* $(mN/m^2)$ |
|---|---|---|---|---|
| Coating 1 | 26.79 | 2.73 | 0 | 26.85 |
| Coating 2 | 27.02 | 2.22 | 0.44 | 28.99 |

*SFE calculated from water, formamide, and diiodomethane contact angles

Interaction with Solid Inks

Inks and ink components tested for solid ink adhesion included formulations of solid inks containing magenta pigment, and synergist formulations containing yellow pigment or magenta pigment. A DSFH-coated polyimide was heated on a hotplate at 120° C. The ink and ink components were dropped onto the inventive coating surface. After 10 minutes, drops were wicked away by applying a cotton-tipped applicator with one dab to each drop. Complete removal of the ink droplets was observed.

The same procedure was repeated except that the drops were wicked away by applying a cotton-tipped applicator with one dab to each drop after 24 hours. Residue was observed but could be very easily removed with a gentle brush across the surface with a KIMWIPE and did not result in surface staining.

Adhesion tests carried out with solid inks/ink components applied to the surface of stainless steel coated with DSFH SFC displayed no permanent adhesion to the surface. Inks could be wicked away with one dab of a cotton applicator after 10 minutes. After a 24 hour standing time at 120° C., some residue remains after one dab of a cotton applicator. However, the inks do not leave a permanent residue, and with either a wipe with a KIMWIPE or repeated dabs with a cotton applicator, all remaining residue are removed. These results show that the SFC coating provides a non-stick layer that resists staining or residue build-up due to solid ink on the surface.

Interaction with UV Inks

By the same methods as for the solid ink adhesion tests, drops of two UV curable phase change inks (Cyan 1 and Cyan 2) and ink base were place on DSFH-coated polyimide sheet at 85° C. After standing at temperature for 2 hours, the UV curable ink and ink base drops could be wicked away with a cotton applicator without any residue remaining. Experiments were not conducted for 24 hours due to evaporation of monomer that would occur over this time frame.

Summary

In summary, the application of siloxyfluorocarbons as sol-gel networked coatings for ink jet print head face coatings demonstrated coatings with high thermal stability, excellent adhesion to metal and polymer substrates, and overall more firm and robust properties than conventional PFA coatings. Moreover, the coatings may be tunable, allowing for the incorporation of medium to high fluorine content in the system to adjust surface energy (e.g., surface energy can be decreased by increasing the fluorine content). In addition, ink adhesion experiments with solid ink and UV curable ink demonstrate the ability of SFC coatings to provide a non-adhering surface as ink jet front face coatings. Lastly, the SFC coatings may be applied by spray coating, which is a fast and flexible method which allows for thin coatings to be applied and heat treated at relatively low temperatures.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. A topcoat layer for ink jet printer components comprising: a sol-gel cross-linked material comprised of siloxyfluorocarbon, the siloxyfluorocarbon being incorporated into the sol-gel cross-linked material from a monomer unit selected from the group consisting of:

and combinations thereof;

wherein independently:
   each $C_f$ is an aliphatic or aromatic fluorocarbon chain;
   each L is a $C_nH2_n$ linker group, where n is a number between 0 and 10; and
   each $X_1$, $X_2$, and $X_3$ are reactive hydroxide functionalities, reactive alkoxide functionalities, unreactive aliphatic functionalities of about 1 carbon atom to about 10 carbon atoms, unreactive aromatic functionalities of about 1 carbon atom to 10 carbon atoms.

2. The topcoat layer of claim 1 further comprising a fluoroplastic resin in an amount of from about 5 percent to about 95 percent by weight of the topcoat layer.

3. The topcoat layer of claim 1, wherein the ink jet printer component is a print head face plate or an image transfixing member.

4. The topcoat layer of claim 1, wherein the monomer unit comprises one selected from the group consisting of and mixtures thereof, where R is a hydrogen, methyl, ethyl, propyl, isobutyl, or mixtures thereof.

5. A topcoat layer for ink jet printer components comprising: a sol-gel cross-linked material comprised of siloxyfluorocarbon, the siloxyfluorocarbon being incorporated into the sol-gel cross-linked material from a monomer unit selected from the group consisting of:

and combinations thereof;

wherein independently:
   each $C_f$ is an aliphatic or aromatic fluorocarbon chain;
   each L is a $C_nH2_n$ linker group, where n is a number between 0 and 10; and
   each $X_1$, $X_2$, and $X_3$ are reactive hydroxide functionalities, reactive alkoxide functionalities, unreactive aliphatic functionalities of about 1 carbon atom to about 10 carbon atoms, unreactive aromatic functionalities of about 1 carbon atom to 10 carbon atoms,
wherein the sol-gel cross-linked material further comprises where R is a hydrogen, methyl, ethyl, propyl, isobutyl, or mixtures thereof.

* * * * *